(12) United States Patent
Rosenberger et al.

(10) Patent No.: US 12,180,107 B2
(45) Date of Patent: Dec. 31, 2024

(54) METHODS FOR PRODUCING A HOLLOW-CORE FIBER AND FOR PRODUCING A PREFORM FOR A HOLLOW-CORE FIBER

(71) Applicant: HERAEUS QUARZGLAS GMBH & CO. KG, Hanau (DE)

(72) Inventors: Manuel Rosenberger, Hanau (DE); Enrico Ehrentraut, Hanau (DE); Benjamin Reis, Hanau (DE); Yusuf Tansel, Hanau (DE); David Kostka, Hanau (DE); Ralph Sattmann, Hanay (DE); Jan Vydra, Hanau (DE)

(73) Assignee: HERAEUS QUARZGLAS GMBH & CO. KG, Hanau (DE)

( * ) Notice: Subject to any disclaimer, the term of this patent is extended or adjusted under 35 U.S.C. 154(b) by 411 days.

(21) Appl. No.: 17/621,607

(22) PCT Filed: Jul. 15, 2020

(86) PCT No.: PCT/EP2020/069998
§ 371 (c)(1),
(2) Date: Dec. 21, 2021

(87) PCT Pub. No.: WO2021/009225
PCT Pub. Date: Jan. 21, 2021

(65) Prior Publication Data
US 2022/0356108 A1 Nov. 10, 2022

(30) Foreign Application Priority Data
Jul. 17, 2019 (EP) ..................................... 19186768

(51) Int. Cl.
*C03B 37/012* (2006.01)
*C03B 37/027* (2006.01)

(52) U.S. Cl.
CPC .... *C03B 37/02781* (2013.01); *C03B 37/0122* (2013.01); *C03B 37/01234* (2013.01); *C03B 2203/16* (2013.01); *C03B 2203/42* (2013.01)

(58) Field of Classification Search
CPC ...... G02B 6/02328; G02B 6/02; C03B 37/012
See application file for complete search history.

(56) References Cited

U.S. PATENT DOCUMENTS 3,805,735 A * 4/1974 Reuschel ................ C30B 31/14
118/733
3,950,073 A * 4/1976 Horiguchi ................ G02B 6/04
385/125

(Continued)

FOREIGN PATENT DOCUMENTS

DE 102004054392 A1 3/2006
DE 102005028219 B3 10/2006

(Continued)

OTHER PUBLICATIONS

Nawazuddin, "Lotus-Shaped Negative Curvature Hollow Core Fiber with 10.5 dB/km at 1550 nm Wavelength", Mar. 1, 2018, Journal of Lightwave Technology, vol. 36, No. 5, 1213-1219 (Year: 2018).*

(Continued)

*Primary Examiner* — Alison L Hindenlang
*Assistant Examiner* — Steven S Lee
(74) *Attorney, Agent, or Firm* — Panitch Schwarze Belisario & Nadel LLP

(57) ABSTRACT

Methods are known for producing an anti-resonant hollow-core fiber which has a hollow core extending along a fiber longitudinal axis and an inner jacket region that surrounds the hollow core, said jacket region comprising multiple anti-resonant elements. The known methods have the steps of: providing a cladding tube that has a cladding tube inner bore and a cladding tube longitudinal axis along which a cladding tube wall extends that is delimited by an interior (Continued)

Figure 1:
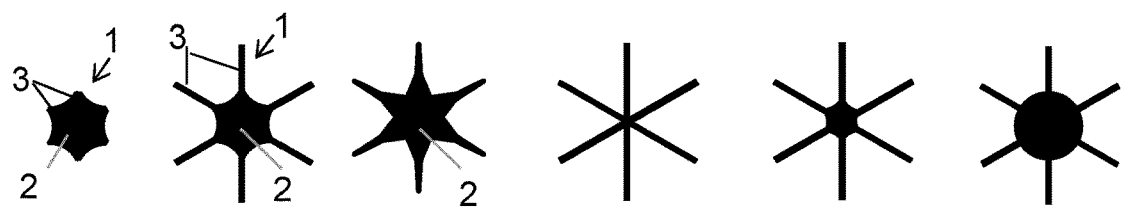

and an exterior; providing a number of tubular anti-resonant element preforms; arranging the anti-resonant element preforms at target positions of the interior of the cladding tube wall, thereby forming a primary preform which has a hollow core region and an inner jacket region; and elongating the primary preform in order to form the hollow-core fiber or further processing the primary preform in order to form a secondary preform. The aim of the invention is to achieve a high degree of precision and an exact positioning of the anti-resonant elements in a sufficiently stable and reproducible manner on the basis of the aforementioned methods. This is achieved in that a positioning template is inserted into the cladding tube inner bore in order to arrange the anti-resonant element preforms, said template having holding elements for positioning the anti-resonant element preforms at the target positions.

19 Claims, 1 Drawing Sheet

(56) References Cited

U.S. PATENT DOCUMENTS

| | | | | |
|---|---|---|---|---|
| 4,750,926 | A * | 6/1988 | Berkey | G02B 6/3803 428/397 |
| 4,978,377 | A * | 12/1990 | Brehm | C03B 37/01231 65/412 |
| 5,017,206 | A * | 5/1991 | Miller | G02B 6/2856 65/409 |
| 5,353,365 | A * | 10/1994 | Dumas | G02B 6/4479 65/425 |
| 5,372,625 | A * | 12/1994 | Brehm | G02B 6/4489 65/410 |
| 6,404,966 | B1 * | 6/2002 | Kawanishi | C03B 37/01205 385/125 |
| 6,444,133 | B1 * | 9/2002 | Fajardo | G02B 6/02328 65/393 |
| 7,841,213 | B2 * | 11/2010 | Kinoshita | C03B 37/0122 65/393 |
| 8,434,330 | B2 * | 5/2013 | Olsen | C03B 37/01217 65/412 |
| 2003/0172682 | A1 | 9/2003 | Sato et al. | |
| 2003/0230118 | A1 | 12/2003 | Dawes et al. | |
| 2004/0096173 | A1 | 5/2004 | Fekety et al. | |
| 2004/0179796 | A1 * | 9/2004 | Jakobsen | C03B 37/01234 385/123 |
| 2005/0185908 | A1 * | 8/2005 | Roberts | C03B 37/016 385/125 |
| 2005/0226578 | A1 * | 10/2005 | Mangan | G02B 6/02347 385/125 |
| 2006/0010921 | A1 * | 1/2006 | Mori | C03B 37/02781 65/393 |
| 2006/0046075 | A1 | 3/2006 | Maul et al. | |
| 2006/0130528 | A1 | 6/2006 | Nelson et al. | |
| 2008/0310806 | A1 | 12/2008 | Mukasa | |
| 2009/0019893 | A1 | 1/2009 | Bogdahn | |
| 2013/0008210 | A1 * | 1/2013 | Chamorovskiy | C03B 37/02781 65/412 |
| 2013/0074551 | A1 * | 3/2013 | Sasaoka | C03B 37/01222 65/409 |
| 2016/0236964 | A1 * | 8/2016 | Fokoua | C03B 37/02781 |
| 2018/0267235 | A1 * | 9/2018 | Russell | C03B 37/02781 |

FOREIGN PATENT DOCUMENTS

| | | | | |
|---|---|---|---|---|
| DE | 102014011041 | A1 | | 1/2016 |
| EP | 3136143 | A1 | | 3/2017 |
| GB | 2566466 | A | | 3/2019 |
| JP | 2003201140 | A | * | 7/2003 |
| JP | 2010286548 | A | * | 12/2010 |
| JP | 2018150184 | A | * | 9/2018 |
| WO | 02/072489 | A2 | | 9/2002 |
| WO | 2018/169487 | A1 | | 9/2018 |
| WO | WO-2019008352 | A1 * | 1/2019 | ............ C03B 23/207 |
| WO | WO-2019053412 | A1 * | 3/2019 | ........ C03B 37/01208 |

OTHER PUBLICATIONS

Edavalath, "design and fabrication of effectively single mode hollow-core single-ring photonic crystal fibres", Oct. 8, 2018, Max Planck Institute for Science of Light, Doctoral thesis of Nitin N. Edavalath (Year: 2018).*
朱笔李, The State Intellectual Property Office of People's Republic of China, First Office Action for 202080040993.9, published Mar. 17, 2023 (Year: 2023).*
International Search Report and Written Opinion mailed Sep. 14, 2020 by the European Patent Office in its capacity as International Searching Authority for counterpart international patent application No. PCT/EP2020/069998 (with English translations attached).
Jasion, Gregory T. et al, "Fabrication of tubular anti-resonant hollow core fibers: modelling, draw dynamics and process optimization" Optics Express vol. 27, No. 15, pp. 20567-20582, Jul. 2019 (DOI: 10.1364/OE.27.020567).
Kosolapov, A.F. et al, "Hollow-core revolver fibre with a double-capillary reflective cladding" Quantum Electronics 46 (3) Mar. 29, 2016 pp. 267-270 (DOI: 10.1070/QEL15972).
Nawazuddin, M.B.S. et al., "Lotus Shaped Negative Curvature Hollow Core Fibre with 10.5 dB/km at 1550 nm Wavelength" 2017 European Conference on Optical Communication (ECOC), IEEE, (2017) pp. 1-3 (DOI: 10.1109/ECOC.2017.8346101).
Poletti, Francesco "Nested antiresonant nodeless hollow core fiber," Optics Express, vol. 22, No. 20 (2014) pp. 23807-23828 (DOI:10.1364/OE 22.023807).
Sherlock, Ben et al., "Tunable fibre-coupled multiphoton microscopy with a negative curvature fibre" Journal of Biophotonics, vol. 9, No. 7, pp. 715-720, (2016) (DOI: 10.1002/jbio.201500290).
Yu, Fei, "Chapter 4—Fabrication of hollow core negative curvature fibre" IN "Hollow core negative curvature fibres" University of Bath PhD. pp. 59-74, Dec. 31, 2013 (XP055656461).
English Summary of Office Action issued Mar. 17, 2023 in CN Application No. 202080040993.9.

* cited by examiner

METHODS FOR PRODUCING A HOLLOW-CORE FIBER AND FOR PRODUCING A PREFORM FOR A HOLLOW-CORE FIBER

TECHNICAL BACKGROUND

The invention relates to a method for producing an anti-resonant hollow-core fiber comprising a hollow core extending along a longitudinal axis of the fiber and a sheath region surrounding the hollow core, which sheath region comprises a plurality of anti-resonance elements, comprising the method steps of:
(a) providing a cladding tube comprising an inner bore of the cladding tube and a longitudinal axis of the cladding tube along which a cladding tube wall delimited by an inner side and an outer side extends,
(b) providing a number of anti-resonance element preforms,
(c) arranging the anti-resonance element preforms at desired positions of the inner side of the cladding tube wall to form a primary preform for the hollow-core fiber, which comprises a hollow core region and a sheath region, and
(d) elongating the primary preform to form the hollow-core fiber, or further processing the primary preform into a secondary preform from which the hollow-core fiber is drawn, wherein the further processing comprises a single or repeated performance of one or more of the following hot-forming processes:
(i) elongation,
(ii) collapse,
(iii) collapse and simultaneous elongation,
(iv) collapse of additional sheath material,
(v) collapse of additional sheath material and subsequent elongation,
(vi) collapse of additional sheath material and simultaneous elongation.

The invention also relates to a method for producing a preform for an anti-resonant hollow-core fiber comprising a hollow core extending along a longitudinal axis of the fiber and a sheath region surrounding the hollow core, which sheath region comprises a plurality of anti-resonance elements, comprising the method steps of:
(a) providing a cladding tube comprising an inner bore of the cladding tube and a longitudinal axis of the cladding tube along which a cladding tube wall delimited by an inner side and an outer side extends,
(b) providing a number of anti-resonance element preforms,
(c) arranging the anti-resonance element preforms at desired positions of the inner side of the cladding tube wall to form a primary preform for the hollow-core fiber, which comprises a hollow core region and a sheath region, and
(d) optionally further processing the primary preform into a secondary preform for the hollow-core fiber, wherein the further processing comprises a single or repeated performance of one or more of the following hot-forming processes:
(i) elongation,
(ii) collapse,
(iii) collapse and simultaneous elongation,
(iv) collapse of additional sheath material,
(v) collapse of additional sheath material and subsequent elongation,
(vi) collapse of additional sheath material and simultaneous elongation.

Conventional single-mode optical fibers made of solid material have a core region made of glass, which is surrounded by a sheath region made of glass with a lower refractive index. Light guidance is based thereby on total reflection between the core and the sheath region. However, the interactions of the guided light with the solid material are associated with an increased latency in data transmission and relatively low damage thresholds with respect to high-energy radiation.

These disadvantages are prevented or reduced by "hollow-core fibers" in which the core comprises an evacuated cavity filled with gas or liquid. In hollow-core fibers, the interaction of the light with the glass is less than in solid-core fibers. The refractive index of the core is less than that of the sheath, so that light guidance by total reflection is not possible and the light would normally escape from the core into the sheath. As a function of the physical mechanism of the light guidance, hollow-core fibers are divided into "photonic bandgap fibers" and "anti-resonance reflection fibers."

In the case of "photonic bandgap fibers," the hollow core region is surrounded by a sheath in which small hollow channels are arranged periodically. On the basis of semi-conductor technology, the periodic structure of the hollow channels in the sheath brings about the effect referred to as the "photonic bandgap," according to which light of certain wavelength ranges scattered at the sheath structures can constructively interfere due to Bragg reflection in the central cavity and cannot propagate transversely in the sheath.

In the embodiment of the hollow-core fiber referred to as "anti-resonant hollow-core fiber" (ARHCF), the hollow core region is surrounded by an inner sheath region in which so-called "anti-resonant elements" (or "anti-resonance elements," "AREs" for short) are arranged. The walls of the anti-resonance elements evenly distributed around the hollow core can act as Fabry-Perot cavities operated in anti-resonance, which reflect the incident light and guide it through the fiber core.

This fiber technology promises a low optical attenuation, a very broad transmission spectrum (even in the UV or IR wavelength ranges) and a low latency in data transmission.

Potential applications of the hollow-core fibers lie in the fields of data transmission, high-power beam guidance, for example for material processing, modal filtering, non-linear optics, in particular for super-continuum generation, from the ultraviolet to the infrared wavelength range.

Prior Art

A disadvantage of anti-resonant hollow-core fibers is that higher-order modes are not necessarily suppressed, so that they are often not exclusively single-mode over long transmission distances and the quality of the output beam deteriorates.

In the paper by Francesco Poletti "Nested anti-resonant nodeless hollow core fiber," Optics Express, vol. 22, no. 20 (2014), DOI: 10.1364/OE 22.023807, a fiber design is proposed, with which anti-resonance elements are not designed as a simple singular structural element but are composed of several nested structural elements. The nested anti-resonance elements are designed such that higher-order core modes, but not the fundamental core mode, are phase-matched to the sheath modes and are suppressed. As a result, the propagation of the fundamental core mode is always ensured, and the hollow-core fiber can be effectively single-mode over a limited wavelength range.

Effective mode suppression depends on the center wavelength of the transmitted light and on the structural parameters of the fiber design, such as the radius of the hollow core and the difference in the diameters of nested ring structures in the anti-resonance elements.

EP 3 136 143 A1 discloses an anti-resonant hollow-core fiber (referred to therein as "hollow-core fiber of non-bandgap type"), with which the core can conduct further modes in addition to the fundamental mode. For this purpose, it is surrounded by an inner sheath having "non-resonant elements," which provide a phase-matching of anti-resonant modes with the higher modes. The hollow-core fiber is produced according to what is known as a "stack-and-draw technique," by arranging the starting elements to form an axially parallel ensemble and fixing them to form a preform and then elongating the preform. In this case, a cladding tube with a hexagonal inner cross-section is used, and six so-called "ARE preforms" (anti-resonance element preforms) are fixed in the inner edges of the cladding tube. This preform is drawn in two stages to form a hollow-core fiber.

WO 2018/169487 A1 discloses a method for producing a preform for anti-resonant hollow-core fibers, with which a first sheath region comprises a plurality of rods and a second sheath region comprises a plurality of tubes surrounded by an outer cladding tube. Rods, tubes and cladding tube are joined to form a preform by means of the "stack and draw" technique. Before the preform is elongated, the preform end is sealed, which is done by applying a sealing compound. For example, a UV adhesive is used as the sealing compound.

Technical Object

Anti-resonant hollow-core fibers, and in particular those with nested structural elements, have complex internal geometries, which makes it difficult for them to be produced exactly and reproducibly. This applies all the more because, if the resonance or anti-resonance conditions are to be maintained, even small variations in dimensions in the order of magnitude of the operating wavelength of the light to be guided cannot be tolerated. Deviations from the desired geometry can be caused by the configuration of the fiber preform, and they can also occur through undesired deformations that are not true to scale in the fiber drawing process.

In the known "stack and draw" technique, many elements are to be joined together with positional accuracy. For example, in order to produce the hollow-core fiber known from the aforementioned paper in the "NANF" design, six anti-resonance element preforms, each consisting of an anti-resonance element outer tube (ARE outer tube, for short), and an anti-resonance element inner tube welded on one side to the inner sheath surface of the ARE outer tube (ARE inner tube, for short), must be attached to the inner side of a cladding tube.

In order to achieve low attenuation values and broad transmission ranges, the azimuthal position of the anti-resonance elements within the cladding tube is also important in addition to a uniform wall thickness of the walls of the anti-resonance elements. This cannot be easily achieved with the "stack and draw" technique. The aim of the invention is to specify a method for the cost-effective production of an anti-resonant hollow-core fiber that avoids the limitations of conventional production methods.

In particular, it is the object of the invention to provide a method for producing an anti-resonant hollow-core fiber and a preform for anti-resonant hollow-core fibers, with which a high precision of the structural elements and an exact positioning of the anti-resonance elements in the fiber can be reproducibly achieved in a sufficiently stable and reproducible manner.

Moreover, disadvantages of the classic "stack and draw" technique, with which the required structural accuracies, in particular a uniform wall thickness of the anti-resonance elements and exact positioning at predetermined azimuthal positions, is not easy to achieve, are to be avoided if at all possible.

SUMMARY OF THE INVENTION

With regard to the method for producing the anti-resonant hollow core fiber, this object is achieved according to the invention, starting from a method of the aforementioned genus according to the invention, in that, in order to arrange the anti-resonance element preforms according to method step (c), a positioning template is inserted into the inner bore of the cladding tube, which positioning template has holding elements for positioning the anti-resonance element preforms in the desired positions.

The starting point for producing the anti-resonant hollow-core fiber is a preform referred to herein as a "primary preform." It comprises a cladding tube in which or on which precursors or preforms for the shaping of anti-resonant elements are contained in the hollow-core fibers (referred to here as "anti-resonance elements" for short). The primary preform can be elongated to form the hollow-core fiber; however, as a rule, the primary preform is further processed to produce therefrom a preform referred to herein as a "secondary preform." Optionally, the hollow-core fiber is produced by elongating the secondary preform. Alternatively, the primary preform or the secondary preform are surrounded by a collecting cylinder or a plurality of collecting cylinders to form a coaxial ensemble of components, and the coaxial ensemble is elongated directly to form the hollow-core fiber. The general term "preform" is understood here to mean the component or the coaxial ensemble of components from which the hollow-core fiber is ultimately drawn.

The addition of sheath material is accomplished, for example, by collapsing a collecting cylinder onto the primary preform. The coaxial arrangement of primary preform and collecting cylinder is elongated or is not elongated when the collecting cylinder collapses. The anti-resonance element preforms here are changed in their shape or arrangement, or they are not changed in their shape or arrangement.

The accuracy of the positioning of the preforms on the inner face of the cladding tube is improved by using a positioning template to arrange the anti-resonance element preforms.

The positioning template has, for example, a shaft projecting into the inner bore of the cladding tube, which shaft is provided with holding elements in the form of a plurality of holding arms pointing radially outwards.

The structurally predetermined star-shaped arrangement of the holding elements facilitates the exact positioning of the anti-resonance element preforms in the respective desired positions, and their fixing.

In a preferred method, the anti-resonance element preforms are tubular with an outer tube surface, wherein each holding element has at least two points of contact with the outer tube surface of the anti-resonance element preform that is to be held.

Two contact points suffice for a defined and stable positioning of the anti-resonance element preform, so that the anti-resonance element preform can be prevented from escaping upon fixing to the inner surface.

In this case, the positioning template is preferably used exclusively in the region of the end faces of the cladding tube, preferably in the region of both end faces of the cladding tube.

The planar contact of the positioning template with the anti-resonance element preforms is thereby limited to the essential. Moreover, during the further handling and processing of the primary preform, the positioning template can also remain in the inner bore of the cladding tube, so that the position of the anti-resonance element preforms remains stable.

In order to fix the positioning template to the cladding tube, it advantageously has at least one latching means that interacts with a counterpart latching means in the cladding tube wall to form a force-fitting and/or positive-locking connection.

The latching means and its counterpart are, for example, a system consisting of hook/eye, spring/groove or the like, preferably a plug-in connection which, in the simplest way possible, is to be attached to the cladding tube wall or inserted into the cladding tube wall. In a simple and preferred instance, at least one of the holding elements of the positioning template forms the latching means or a component thereof.

For example, it has proven to be advantageous if the latching means counterpart is arranged in the end face of the cladding tube wall and the latching means is completely retractable therein.

The cladding tube end face thus retains its flatness, which facilitates the connection to other components, such as the adhesive connection to a tubular holder.

It is advantageous if the latching means counterpart does not reach the outer face of the cladding tube and does not break through it. The tightness of an end-face connection of a holder or of another component with respect to the cladding tube can thereby possibly be facilitated.

Positioning templates made of graphite or glass, preferably of quartz glass, have proven particularly successful.

Positioning templates made of these materials can be machined with a high degree of purity and with a high degree of accuracy, with a dimensional deviation of less than +/−0.1 mm. They exhibit a high temperature stability, and they behave inertly with respect to the material of the hollow-core fiber, in particular with respect to glass. Given its easier processability, graphite is a particularly preferred material.

The accuracy of positioning of the preforms on the inner face of the cladding tube is improved in that the inner side of the cladding tube is generated by machining, in particular by drilling, milling, grinding, honing, and/or polishing.

In comparison to other known forming techniques, said machining techniques provide more precise and finer structures by using heat and pressure, and they avoid contamination of surfaces by forming tools, such as nozzles, presses or fusion molds.

The machining preferably also comprises a structuring of the inner side of the cladding tube in the area of desired positions of the anti-resonance element preforms by providing it with a longitudinal structure extending in the direction of the longitudinal axis of the cladding tube. This longitudinal structure comprises, for example, longitudinal slots and/or longitudinal grooves in the inner wall of the cladding tube, which run parallel to the longitudinal axis of the cladding tube and which are preferably produced by drilling, sawing, milling, cutting or grinding.

The longitudinal structure extending in the direction of the longitudinal axis of the cladding tube serves as a positioning aid for the anti-resonance element preforms. It makes it easier for the anti-resonance element preforms to assume predetermined defined positions on the inner side of the cladding tube.

Particularly in the event of continuous longitudinal slots, it is advantageous if the cladding tube has face ends, wherein the longitudinal slots end before the face ends. However, longitudinal grooves that do not break through the cladding tube wall preferably extend as far as the face ends.

In a preferred method variant, the longitudinal structure has longitudinal slots distributed around the circumference of the cladding tube wall, wherein the anti-resonance element preforms are arranged on a longitudinal slot.

The longitudinal slots penetrate the cladding tube wall from the inside to the outside, with the exception of the two end-face end regions of the cladding tube. They have parallel longitudinal edges and exhibit a maximum slot width $S_B$, wherein the anti-resonance element preforms are preferably connected to the longitudinal edges. The width dimension of the anti-resonance element preforms is thereby greater than the maximum width $S_B$, so that they are not completely immersed in the longitudinal slots. The region below the longitudinal edges forms a cavity into which a gas can be introduced or from which a gas can be drawn off.

In a preferred method variant, the arrangement of the anti-resonance element preforms at desired positions on the inner side of the cladding tube wall, and/or the drawing of the hollow-core fiber according to method step (c), comprises a fixing measure and/or a sealing measure using a sealing or bonding compound containing amorphous $SiO_2$ particles.

The sealing or bonding compound used for sealing or fixing contains amorphous $SiO_2$ particles, which are held, for example, in a dispersion liquid. This compound is applied between the surfaces to be bonded or sealed and is generally pasty during use. When dried at low temperature, the dispersion liquid is partially or completely removed and the compound solidified. The sealing or bonding compound, and, in particular, the solidified $SiO_2$-containing sealing or bonding compound obtained after drying, satisfies the requirements for fixing and compacting. The temperature required for drying is below 300° C., which facilitates compliance with the dimensional stability of the preform and avoids thermal impairments. Heating to higher temperatures around 800° C., for example during elongation of the preform to form the hollow-core fiber, results in further thermal solidification of the sealing or bonding compound, which is also suitable for forming opaque or transparent glass. This is done by sintering or vitrifying, wherein sintering to form opaque glass requires comparatively lower temperatures and/or short heating durations than vitrifying to complete transparency. The sealing or bonding compound can thus be completely compacted by heating and vitrified by heating in the hot-forming process. The sealing or bonding compound behaves like quartz glass; it becomes viscous and deformable.

In the hot-forming process, the sealing or bonding compound does not decompose and releases few impurities. It is thus characterized by thermal stability and purity in the hot-forming process and avoids deformations resulting from different thermal coefficients of expansion.

In particular with regard to a low optical attenuation and a large optical transmission bandwidth of the hollow-core fiber, it has proven to be particularly advantageous for the anti-resonance element preforms to be arranged around the hollow core with an odd-numbered symmetry.

In a preferred method, the accuracy of the positioning of the preforms in the cladding tube is further improved in that tubular structural elements are provided, of which at least some have a wall thickness in the range of 0.2 and 2 mm, preferably a wall thickness in the range of 0.25 and 1 mm, and wherein a cladding tube with an external diameter in the range of 90 and 250 mm, and preferably with an external diameter in the range of 120 to 200 mm, is provided. These components each have a length of at least 1 m. They are relatively high-volume structural elements for forming anti-resonance elements. This simplifies handling. In addition, with a vertical arrangement of cladding tube and structural elements, gravitational force supports the parallelism and vertical alignment of the longitudinal axes of the structural elements when the structural elements are each positioned and fixed in the desired position at their upper face end; for example and preferably using the sealing or bonding compound explained in more detail above, and additionally or alternatively thereto, by means of the positioning template described in detail above.

With regard to the production of the preform for the hollow-core fiber, the aforementioned technical object is achieved according to the invention starting from a method of the aforementioned genus according to the invention in that the arrangement of the anti-resonance element preform according to method step (c) takes place by means of a positioning template inserted into the inner bore of the cladding tube, which positioning template has holding elements for positioning the anti-resonance element preforms in the desired positions.

The preform is a starting point for the production of the anti-resonant hollow-core fiber. By elongating the primary preform, either the anti-resonant hollow-core fiber is drawn directly, or a different semi-finished product is first produced by further processing of the primary preform, which semi-finished product is also referred to herein as the "secondary preform," and from which semi-finished product the anti-resonant hollow-core fiber can be drawn.

In any case, the production of the preform comprises the installation and the connecting of anti-resonance element preforms to a cladding tube. The accuracy of the positioning of the preforms is improved by using a positioning template to arrange the anti-resonance element preforms. An additional improvement is achieved by the cladding tube being structured beforehand.

Measures for producing the preform are explained above in connection with the production of the hollow-core fiber, and these explanations are included herewith.

Definitions

Individual method steps and terms of the above description are additionally defined below. The definitions are part of the description of the invention. That which is expressed in the description is definitive in the event of a factual contradiction between one of the following definitions and the remaining description.

Anti-Resonance Elements

The anti-resonance elements may be simple or nested structural elements of the hollow-core fiber. They have at least two walls that, when viewed from the direction of the hollow core, have a negative curvature (convex) or do not have a curvature (planar, straight). They generally consist of a material that is transparent to the working light, for example glass, in particular doped or undoped $SiO_2$, a plastic, in particular a polymer, a composite material or crystalline material.

Anti-Resonance Element Preform/Anti-Resonance Element Precursor

What are referred to as anti-resonance element preforms are components or constituents of the preform that essentially become anti-resonance elements in the hollow-core fiber by simple elongation during the fiber-drawing process. Components or constituents of the preform that become anti-resonance element preforms only upon forming or that become anti-resonance elements directly are referred to as anti-resonance element precursors. The anti-resonance element preforms may be simple or nested components to which additional positioning aids can be fixed. They are originally present in the primary preform.

Nested anti-resonance element preforms form nested anti-resonance elements in the hollow-core fiber. They are composed of an outer tube and at least one further structural element that is arranged in the inner bore of the outer tube. The further structural element can be a further tube which bears against the inner sheath surface of the outer tube. The outer tube is referred to as an "anti-resonance element outer tube" or an "ARE outer tube" for short, and the further tube is referred to as an "anti-resonance element inner tube" or an "ARE inner tube" for short, or also as a "nested ARE inner tube."

In the case of multi-nested anti-resonance element preforms, at least one further structural element, for example a third tube abutting against the inner sheath surface of the nested ARE inner tube, can be arranged in the inner bore of the nested ARE inner tube. Where there are multi-nested anti-resonance element preforms, in order to distinguish between the multiple tubes that are arranged within the ARE outer tube, a distinction can optionally be made between "outer nested ARE inner tube" and "inner nested ARE inner tube."

The term "cross-section" in conjunction with cylindrical anti-resonance element preforms and their cylindrical structural elements always refers to the cross-section perpendicular to the respective longitudinal axis of the cylinder, namely, unless otherwise indicated, the cross-section of the outer contour in tubular components (not the cross-section of the inner contour).

Further processing of the primary preform, in particular by hot-forming steps, can result in intermediate products, in which the original anti-resonance element preforms are present in a shape that has been modified compared to the original shape. The modified shape is also referred to herein as an anti-resonance element preform or as an anti-resonance element precursor.

Preform/Primary Preform/Secondary Preform/Core Preform (Cane)

The preform is the component from which the anti-resonant hollow-core fiber is drawn. It is a primary preform or a secondary preform produced by further processing of the primary preform. The primary preform can be present as an ensemble consisting of at least one cladding tube and preforms or precursors for anti-resonance elements that are loosely accommodated or firmly fixed therein. The further processing of the primary preform into a secondary preform from which the hollow-core fiber is drawn can comprise a single or repeated performance of one or more of the following hot-forming processes:
  (i) elongation,
  (ii) collapse,
  (iii) collapse and simultaneous elongation,
  (iv) collapse of additional sheath material,
  (v) collapse of additional sheath material and subsequent elongation, (vi) collapse of additional sheath material and simultaneous elongation.

A preform obtained by collapsing and/or elongating a primary preform is referred to in the literature as a cane. Typically, it is overlaid with additional sheath material before or during drawing of the hollow-core fiber.

Elongating/Collapsing

During elongation, the primary preform is lengthened. The lengthening can take place without simultaneous collapse. Elongation can take place true to scale, so that, for example, the shape and arrangement of components or constituents of the primary preform is reflected in the elongated end product. During elongation, however, the primary preform can also be drawn not true to scale and its geometry can be modified.

During collapse, an inner bore is narrowed or annular gaps between tubular components are closed or narrowed. Collapse is generally accompanied by elongation.

Hollow Core/Inner Sheath Region/Outer Sheath Region

The ensemble comprising at least one cladding tube and therein loosely accommodated or firmly fixed preforms or precursors for anti-resonance elements is also referred to herein as "primary preform." The primary preform comprises the hollow core and a sheath region. This sheath region is also referred to as an "inner sheath region" if there is also an "outer sheath region" that has been produced, for example, by collapsing onto the ensemble, and if a distinction is to be made between said sheath regions. The terms "inner sheath region" and "outer sheath region" are also used for the corresponding regions in the hollow-core fiber or in intermediate products obtained by further processing of the primary preform.

The designation "inner side of the tube" is also used as a synonym for "inner sheath surface of the tube," and the designation "outer side of the tube" is also used as a synonym for "outer sheath surface of the tube." The term "inner bore" in conjunction with a tube does not mean that the inner bore has been produced by a drilling process.

Machining

This refers to separating mechanical manufacturing methods for the separating processing of a workpiece, in particular turning, cutting, drilling, sawing, milling and grinding. This machining creates a longitudinal structure extending in the direction of the longitudinal axis of the cladding tube, which serves as a positioning aid for the anti-resonance element preforms. The longitudinal structure is accessible from the inner side of the cladding tube; it can also extend through the entire cladding tube wall to the outer side.

Particle Size and Particle Size Distribution

Particle size and particle size distribution of the $SiO_2$ particles are characterized using the $D_{50}$ values. These values are taken from particle size distribution curves showing the cumulative volume of $SiO_2$ particles as a function of the particle size. The particle size distributions are often characterized on the basis of the respective $D_{10}$, $D_{50}$ and $D_{90}$ values. The $D_{10}$ value thereby characterizes the particle size that is not achieved by 10% of the cumulative volume of the $SiO_2$ particles, and accordingly, the $D_{50}$ value and the $D_{90}$ value characterize the particle sizes that are not achieved by 50% or by 90%, respectively, of the cumulative volume of the $SiO_2$ particles. The particle size distribution is determined by scattered light and laser diffraction spectroscopy according to ISO 13320.

EXEMPLARY EMBODIMENT

Figure 2:
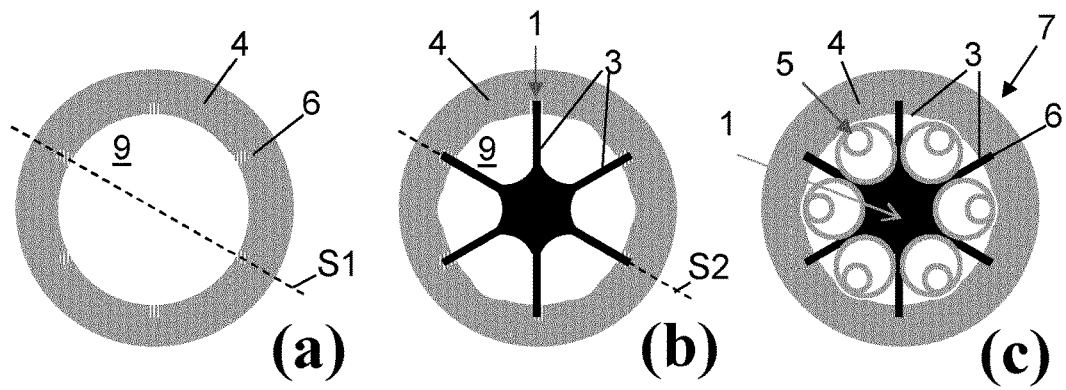
Figures 3, 4:
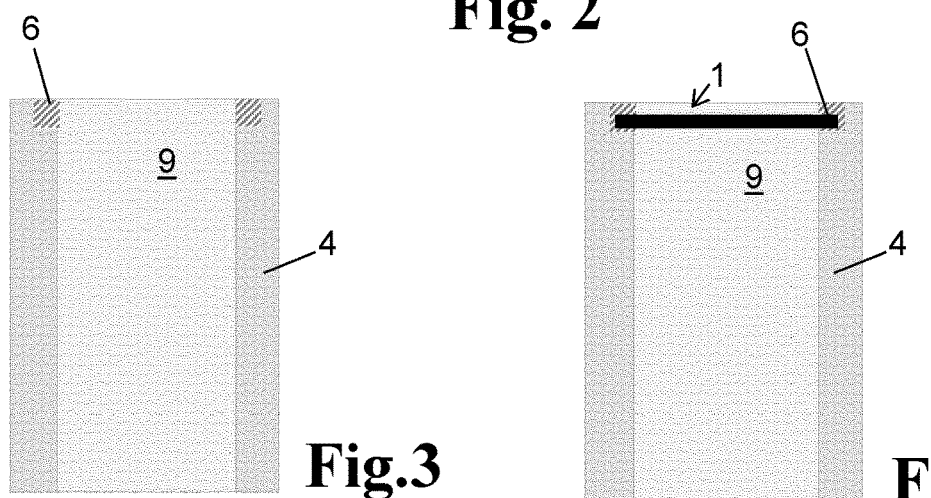
Figure 5:
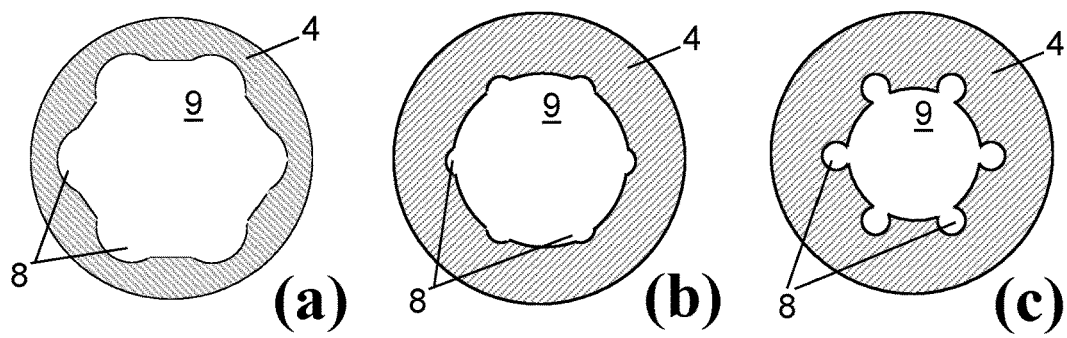

The invention is explained in more detail below with reference to an exemplary embodiment and a drawing. The following are shown in detail in schematic representation:

FIG. 1 embodiments of positioning templates in a view of the top side,

FIG. 2 method steps for positioning anti-resonance element preforms on the inner face of a cladding tube using a positioning template, FIG. 3 a longitudinal section along section line S1 through the cladding tube of FIG. 2(a), with an end-face groove for receiving a positioning template, FIG. 4 a longitudinal section along section line S2 through the cladding tube of FIG. 2(b), with a positioning template inserted, and FIG. 5 embodiments of cladding tubes with additional longitudinal structures for positioning anti-resonance element preforms.

In the production of the hollow-core fiber or of the preform for the hollow-core fiber, a plurality of components are to be connected together. In addition, it can be helpful to seal existing gaps or channels of the preform when carrying out hot-forming processes. For bonding or sealing, a sealing or bonding compound based on $SiO_2$ is used, as is known from DE 10 2004 054 392 A1. In this case, an aqueous slip containing amorphous $SiO_2$ particles having a particle size distribution characterized by a $D_{50}$ value of about 5 μm and by a $D_{90}$ value of about 23 μm is produced by wet-milling silica glass grains. Further amorphous $SiO_2$ grains with an average grain size of about 5 μm are mixed with the base slip. The slip used as a bonding compound has a solids content of 90%, which consists of at least 99.9 wt. % $SiO_2$.

FIG. 1 schematically shows in plan view a plurality of star-shaped embodiments of the positioning template 1 for use in the method according to the invention. Each positioning template 1 has a central region (shaft 2) from which extend holding arms 3 pointing radially outwards to a greater or lesser extent.

FIG. 2 shows method steps for installing the positioning template in a cladding tube 4, and for positioning anti-resonance element preforms 5 by means of the positioning template 1. The inner face and the outer lateral surface of the cladding tube 4 are mechanically processed and brought to their final dimensions by grinding, honing and polishing. At the same time, a structuring of the inner side of the cladding tube in the area of the desired positions of the anti-resonance element preforms 5 was carried out, which will be explained in more detail below.

FIG. 2(a) and the corresponding longitudinal section of FIG. 3 show that, at the end faces of the cladding tube 4, grooves 6 have been milled from the inner face. The grooves 6 have a width and a depth of 2 mm, respectively. They do not pierce the outer lateral surface of the cladding tube 4. They serve to accommodate the arms 3 of a positioning template 1 that is inserted into the inner bore 9 in the region of the end face of the shell tube 4. The grooves 6 are adapted to the dimensions of the holding arms 3 and inasmuch act as counter-latching means for the holding arms 3 (spring) to be received. This is shown schematically in FIG. 2(b) and in the associated longitudinal section of FIG. 4. The ends of the holding arms 3 are completely accommodated in the grooves 6, so that they do not project beyond the end face of the cladding tube, and thus do not impair its flatness.

FIG. 2(c) shows that anti-resonance element preforms 5 are positioned between the holding arms 3. The anti-resonance element preforms 5 thereby abut both of the holding arms 3 and the shaft 2, so that they are secured against slippage in the peripheral as well as in the radial direction.

The anti-resonance element preforms 4 are fixed to the inner wall of the cladding tube 4 by means of the above-described bonding compound based on $SiO_2$. The bonding compound is applied locally in the region of the face ends of the anti-resonance element preform 5, and the anti-resonance element preforms are placed thereon using the positioning template 1. The positioning template 1 is thereby limited to the region around the two end-face cladding tube ends.

This method creates a precise and reproducible connection between the cladding tube 4 and the anti-resonance element preforms 5. Solidification of the bonding compound at low temperature below 300° C. is sufficient for fixing, so that an intense heating of the surrounding regions and thus a deformation of anti-resonance element preforms 5 is avoided.

The cladding tube 4 is made of quartz glass. It has a length of 500 mm, an external diameter of 73 mm, and an internal diameter of 24 mm. The ensemble consisting of cladding tube 4 and anti-resonance element preforms 5 positioned therein is referred to herein as the "primary preform" 7.

FIG. 5 shows further embodiments of cladding tubes 4 in a view of the cladding tube end face. The cladding tubes 4 have respective longitudinal grooves 8 on the inner surface of the cladding tube wall. The longitudinal grooves 8 are distributed uniformly in hexagonal symmetry about the inner circumference of the respective cladding tube 4. They serve as additional positioning aids for the anti-resonance element preforms 5.

FIG. 5(*a*) shows flat, broad longitudinal grooves 8, which are dish-shaped in cross-section and produced by milling. FIG. 5(*b*) shows flat, narrow longitudinal grooves 8, which are semi-circular in cross-section and likewise are produced by milling. FIG. 5(*c*) shows deep, narrow, circular longitudinal grooves 8, which are almost closed in cross-section and produced by drilling. The maximum depth is 3 mm and the internal diameter is 4 mm.

In order to produce the anti-resonant hollow-core fiber, the primary preform 7 is covered with a collecting cylinder, in order to add additional sheath material and to adjust the core-to-sheath diameter ratio prespecified for the hollow core fiber in the final, secondary preform.

The invention claimed is:

1. A method for producing an anti-resonant hollow-core fiber having a hollow core extending along a longitudinal axis of the hollow-core fiber and an inner sheath surrounding the hollow core, which sheath includes a plurality of anti-resonance elements, the method comprising the steps of:
   (a) providing a cladding tube having an inner bore and a longitudinal axis, along which a cladding tube wall delimited by an inner side and an outer side extends;
   (b) providing a plurality of anti-resonance element preforms;
   (c) arranging the anti-resonance element preforms at desired positions on the inner side of the cladding tube wall to form a primary preform for the hollow-core fiber by inserting a positioning template having holding elements into the inner bore of the cladding tube so that the holding elements position the anti-resonance element preforms at the desired positions; and
   (d) elongating the primary preform to form the hollow-core fiber, or further processing the primary preform into a secondary preform from which the hollow-core fiber is drawn, wherein the further processing includes a single or repeated performance of one or more of the following hot-forming processes:
   (i) elongating the primary preform,
   (ii) collapsing the primary preform,
   (iii) collapsing and simultaneously elongating the primary preform,
   (iv) collapsing additional sheath material,
   (v) collapsing additional sheath material and subsequently elongating the primary preform,
   (vi) collapsing additional sheath material and simultaneously elongating the primary preform, wherein the positioning template has at least one latch which interacts with a counterpart latch in the cladding tube wall to form a force-fitting and/or positive-locking connection.

2. The method according to claim 1, wherein the positioning template has a shaft projecting into the inner bore of the cladding tube, which shaft has a plurality of holding arms pointing radially outwards.

3. The method according to claim 1, wherein the anti-resonance element preforms are tubular with an outer tube surface, and each holding element has at least two points of contact with the outer tube surface of the anti-resonance element preform that is to be held.

4. The method according to claim 1, wherein the cladding tube has a pair of end faces and the positioning template is used in the region of at least one of the end faces.

5. The method according to claim 1, wherein the counterpart latch is arranged in an end face of the cladding tube wall and the latch is completely retractable therein.

6. The method according to claim 1, wherein the counterpart latch does not extend as far as an outer face of the cladding tube.

7. The method according to claim 1, wherein the positioning template consists of graphite or glass.

8. The method according to claim 1, further comprising producing the positioning template by machining with a dimensional deviation of less than +/−0.1 mm.

9. The method according to claim 1, wherein the cladding tube has a circular inner cross-section and the inner side of the cladding tube wall has a longitudinal structure that is designed as a longitudinal groove or as a longitudinal slot.

10. The method according to claim 1, further comprising machining the inner side of the cladding tube.

11. The method according to claim 1, further comprising fixing and/or sealing using a sealing or bonding compound containing amorphous $SiO_2$ particles to arrange the anti-resonance element preforms at the desired positions on the inner side of the cladding tube wall and/or to elongate or further process the primary preform according to method step (d).

12. A method for producing a preform for an anti-resonant hollow-core fiber having a hollow core extending along a longitudinal axis of the hollow-core fiber and an inner sheath surrounding the hollow core, which sheath includes a plurality of anti-resonance elements, the method comprising the steps of:
   (a) providing a cladding tube having an inner bore and a longitudinal axis, along which a cladding tube wall delimited by an inner side and an outer side extends;
   (b) providing a plurality of anti-resonance element preforms;
   (c) arranging the anti-resonance element preforms at desired positions on the inner side of the cladding tube wall to form a primary preform for the hollow-core fiber by inserting a positioning template having holding elements into the inner bore of the cladding tube so that the holding elements position the anti-resonance element preforms at the desired positions; and
   (d) optionally further processing the primary preform into a secondary preform for the hollow-core fiber, wherein the further processing includes a single or repeated performance of one or more of the following hot-forming processes:
(i) elongating the primary preform,
(ii) collapsing the primary preform,
(iii) collapsing and simultaneously elongating the primary preform,
(iv) collapsing additional sheath material,
(v) collapsing additional sheath material and subsequently elongating the primary preform,
(vi) collapsing additional sheath material and simultaneously elongating the primary preform, wherein the positioning template has at least one latch which interacts with a counterpart latch in the cladding tube wall to form a force-fitting and/or positive-locking connection.

13. The method according to claim 12, wherein the positioning template has a shaft projecting into the inner bore of the cladding tube, which shaft has a plurality of holding arms pointing radially outwards.

14. The method according to claim 12, wherein the positioning template has holding elements and the anti-resonance element preforms are tubular with an outer tube surface, and each holding element has at least two points of contact with the outer tube surface of the anti-resonance element preform that is to be held.

15. The method according to claim 12, wherein the cladding tube has a pair of end faces and the positioning template is used in the region of at least one of the end faces.

16. The method according to claim 4, wherein the positioning template is used in the region of both of the end faces.

17. The method according to claim 7, wherein the positioning template consists of quartz glass.

18. The method according to claim 10, wherein the step of machining includes drilling, milling, grinding, honing, and/or polishing.

19. A method for producing an anti-resonant hollow-core fiber having a hollow core extending along a longitudinal axis of the hollow-core fiber and an inner sheath surrounding the hollow core, which sheath includes a plurality of anti-resonance elements, the method comprising the steps of:

(a) providing a cladding tube having an inner bore, a pair of end faces, and a longitudinal axis, along which a cladding tube wall delimited by an inner side and an outer side extends;
(b) providing a plurality of tubular anti-resonance element preforms with an outer tube surface;
(c) arranging the anti-resonance element preforms at desired positions on the inner side of the cladding tube wall to form a primary preform for the hollow-core fiber by inserting a positioning template having holding elements into the inner bore of the cladding tube so that the holding elements position the anti-resonance element preforms at the desired positions, wherein the positioning template has a shaft that projects into the inner bore of the cladding tube and has a plurality of holding arms pointing radially outwards, each holding element has at least two points of contact with the outer tube surface of the anti-resonance element preform that is to be held, and the positioning template is used in the region of at least one of the end faces; and
(d) elongating the primary preform to form the hollow-core fiber, or further processing the primary preform into a secondary preform from which the hollow-core fiber is drawn, wherein the further processing includes a single or repeated performance of one or more of the following hot-forming processes:
(i) elongating the primary preform,
(ii) collapsing the primary preform,
(iii) collapsing and simultaneously elongating the primary preform,
(iv) collapsing additional sheath material,
(v) collapsing additional sheath material and subsequently elongating the primary preform,
(vi) collapsing additional sheath material and simultaneously elongating the primary preform, wherein the positioning template has at least one latch which interacts with a counterpart latch in the cladding tube wall to form a force-fitting and/or positive-locking connection.

* * * * *